July 9, 1935.  J. R. ORELIND  2,007,811
ADJUSTABLE TRACTOR WHEEL
Filed June 15, 1934  2 Sheets-Sheet 1
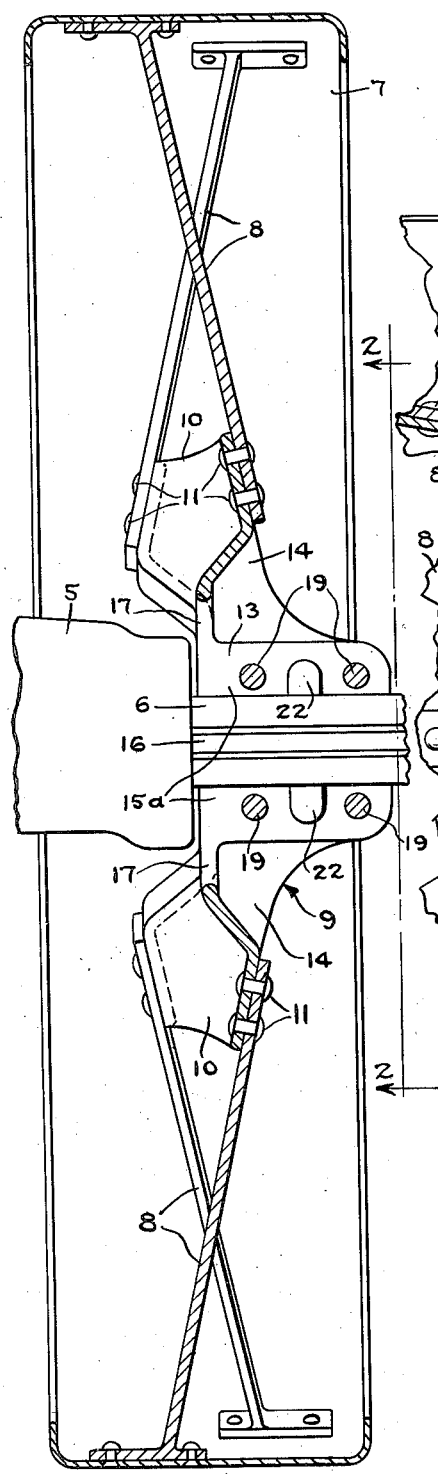
Fig.-1.
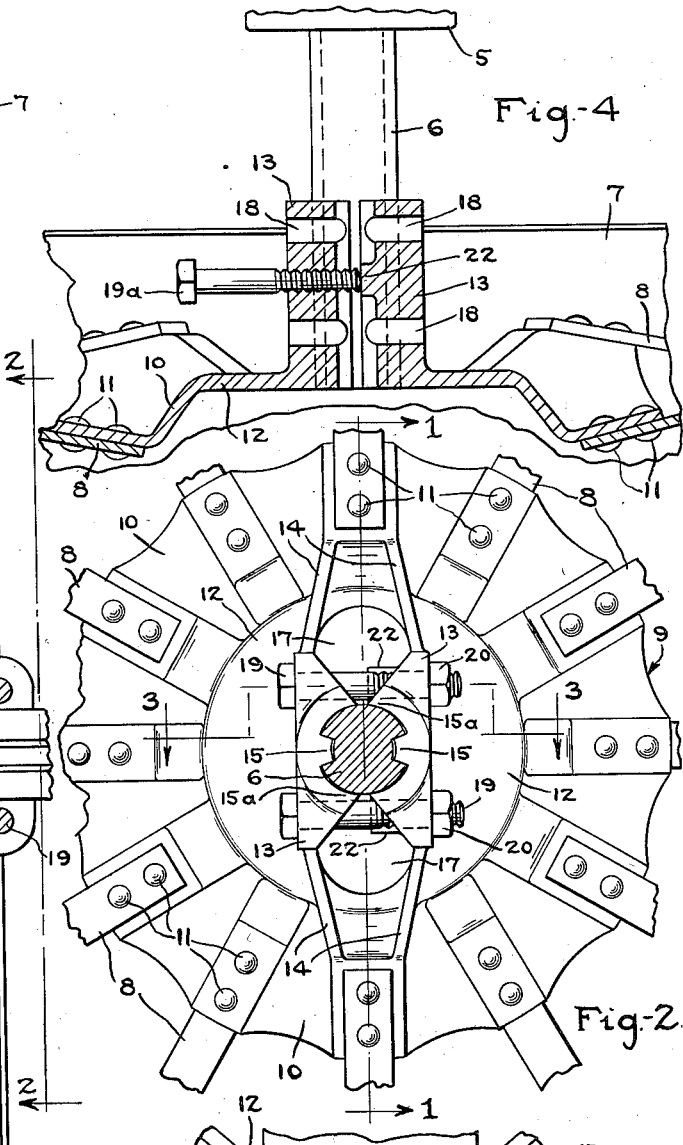
Fig.-4
Fig.-2.
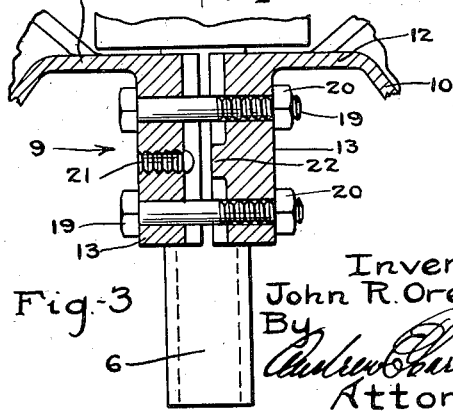
Fig.-3
Inventor:
John R. Orelind
By
Attorney.

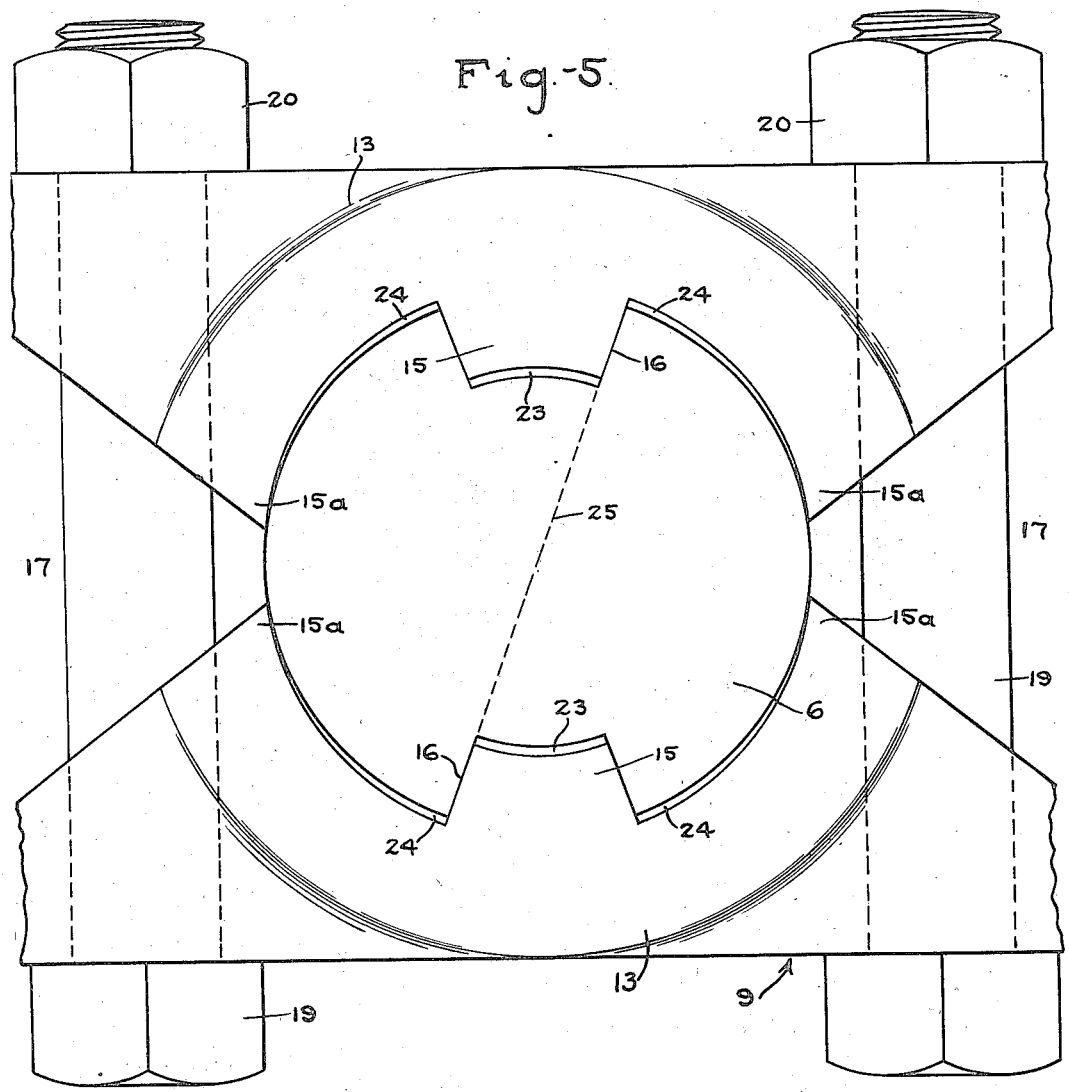

Patented July 9, 1935

2,007,811

UNITED STATES PATENT OFFICE 2,007,811

ADJUSTABLE TRACTOR WHEEL

John R. Orelind, Moline, Ill., assignor to Minneapolis-Moline Power Implement Company, Hopkins, Minn., a corporation of Delaware Application June 15, 1934, Serial No. 730,780

4 Claims. (Cl. 287—52.03)

This invention relates to tractor construction, and the primary object is to provide means of a novel, efficient, and practical nature for mounting a traction wheel with respect to the drive axle and body of the tractor, whereby said wheel may be readily moved longitudinally on the axle to obtain axial adjustments, within certain limits, in the span or transverse spread between the drive wheels; and which mounting will also permit of the wheel hub to be reversed, end for end, on the axle, so that operative position of the wheel rim, which rim is offset with respect to the hub, may be disposed beyond the adjustment limits first referred to. More specifically the object is to provide a tractor wheel with an offset hub for reversible engagement on the axle, and with the hub partially split radially, or otherwise formed to provide flexing action to permit it to be spread under pressure to facilitate removal and replacement of the wheel on the axle. The invention further contemplates the use of devices, such as bolts, for rigidly securing the wheel hubs on the axles and which devices may also be employed, when adjustments are to be made, for exerting the necessary hub opening or spreading pressure. A further object is to provide, in conjunction with a hub structure of the character noted, a tapered key arrangement having certain advantages, to be subsequently set forth. Still further and more detailed objects will be disclosed in the course of the following specification, reference being had to the accompanying drawings; wherein:

Fig. 1 is a vertical sectional elevation through my improved wheel construction, showing it as applied to a tractor axle, the outer extremity of which axle is broken away, this elevation being taken as on the line 1—1 in Fig. 2.

Fig. 2 is a plan elevation of the wheel hub as on the line 2—2 in Fig. 1.

Fig. 3 is a sectional detail view, as on the line 3—3 in Fig. 2.

Fig. 4 is a sectional detail view, as on the line 3—3 in Fig. 2, but with the wheel hub in its reversed position on the axle to secure maximum spread between the two tractor wheels.

Fig. 5 is an enlarged detail end elevation of the drive axle and the adjacent hub portion mounted thereon, this view illustrating the tapered key construction and certain clearances, which clearances are slightly exaggerated for purpose of illustration.

Figs. 1 and 3 illustrate the arrangement of the hub on the axle to effect the minimum wheel span. In some instances and for certain types of work it may be desirable to secure one of a pair of tractor wheels in an outward position and the other in closer proximity to the tractor body. Ordinarily, however, both wheels are adjusted in a similar manner at the respective sides of the tractor, and the purpose of such adjustment is to effect cooperation with implements such as cultivators, planters, plows, etc., carried by or pushed or pulled by the tractor, and to give proper clearance for crop rows, which often vary in spacing, so that the wheels will not traverse either the crop growth or the implement path of travel.

To these ends the tractor structure proper may be of any conventional structure, as far as the present invention is concerned, and is here only represented by a portion of the axle housing 5, through and from which the drive axle 6 extends, it being understood that the structure illustrated is the same at both sides of the machine.

The wheel structure includes a rim 7, spokes 8, of conventional construction, and a hub unit, designated generally by the numeral 9. The hub unit includes an outer plate portion 10, having alternate inner and outer offset portions to which the inner ends of the spokes 8 are attached, as at 11; inner plate portions 12, substantially crescent shaped in form; and a cooperating pair of bearing segments or blocks 13. The parts 10, 12, and 13 are integrally connected so as to form a relatively rigid, one piece unit, and the ends of the segments 13 opposite the plate portions 12 are further united with the plate portions by integral bracing webs or flanges 14, arranged in pairs as shown in Fig. 2.

The segments 13 are designed to snugly receive the axle 6 and are splined to the axle for sliding but non-rotative movement thereon, the splining, in this instance, comprising feather keys 15 projecting inwardly from the segments 13 for engagement in keyways 16 of the axle.

It will be noted that the segments 15 have opposed axle engaging, angular shoulders 15a that are spaced from each other, as shown in Figs. 2 and 5, and that radially outwardly of such spaces the hub unit is provided with diametrically opposed openings 17. The purpose of these spaces and openings is to impart to the axle engaging segments a slight degree of flexibility, and this flexibility is utilized both in clamping the hub unit to and releasing it from the axle.

To the end that the hub unit, and thereby the wheel as a whole, may be rendered rigid with respect to the axle, I provide the segment blocks 13 with two pairs of aligned holes 18 to receive a set of clamping bolts 19, which when their nuts 20 are tightened will produce the desired clamping action.

When the wheel is to be axially adjusted or its position reversed on the axle, the bolts must of course be loosened, but merely loosening the bolts is frequently found to be insufficient to release the hub unit so that adjustments or reversal can be accomplished. And to the end that stuck or "frozen" wheels may be more quickly released I provide one of the segment blocks 13 with a tapped or threaded hole 21 (Fig. 3) to receive a bolt 19ª (Fig. 4), which bolt may be a special bolt for that purpose or may be one of the clamping bolts 19 merely removed and utilized until the adjustment has been made.

The tapped hole 21, is most efficiently located between the pair of bolt holes 18, at one side of the axle, and preferably there is one hole 21 at each side of the axle. In axial alignment with the tapped hole 21 the opposite segment block 13 is provided with an abutment lug 22, and where two tapped holes are provided in one segment block, then the opposite block will have two lugs 22, as shown in Figs. 1 and 2.

Attention is now directed particularly to Fig. 5, wherein I have illustrated, in enlarged detail, certain features of important consideration in the invention. Here it will be seen that the keys 15 and keyways 16 are tapered toward the center of the axle 6 and that clearances 23 and 24 are provided so that the side faces of the keys 15 will contact with the side walls of the keyways 16 before said clearances can be closed but not before the segment shoulders 15a contact with the axle. The wedging action resulting from this construction provides for maximum efficiency in the clamping pressure when the latter is applied. The arrangement also permits of a positive release of the hub from the axle when the segment spreading pressure is applied, for immediately this is done all lateral frictional resistance of the keys in the axle is removed. This would not be the case for instance if the keys and ways were rectangular in cross section, for then the lateral resistance would remain unless and until the keys were entirely removed from the keyways. The most efficient and desirable degree of taper for the keys is that wherein the contacting faces are disposed in radial planes as indicated by dotted line 25, as it sufficiently facilitates release of the keys under the provided segment spreading action, and also precludes the driving torque of the axle from acting on the sides of the keys with a spreading action when the wheel is in use.

When the wheel is to be axially adjusted or reversed on the axle the axle housing 5 is first jacked up to provide ground clearance under the wheel rim. The bolts 19 are then loosened to release their clamping action with respect to the axle. To further and more positively release the wheel hub it is then necessary to insert bolts in the holes 21 and by forcing them into contact with the lugs 22 the hub segments 13 will be spread apart to produce the desired clearance as between axle and segments. When the desired adjustment has been secured the spreading pressure is released, the clamping bolts are retightened, and the wheel is again grounded, ready for use in its adjusted or reversed position.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hub structure for a wheel comprising a one piece member having in combination, an outer annular plate portion, inner plate portions extending inwardly from the outer portions and separated by a diametrical division, a pair of axle receiving segment blocks extending laterally from the inner plate portions, said inner plate portions transmitting annular torque pressure of the axle and segment blocks to the outer plate portion but having sufficient resiliency in a direction other than in the plane of torque action to permit opening and closing action of the segment blocks upon application of pressure thereto, bracing webs integrally connecting the segment blocks with the outer annular plate portion and disposed at substantially right angles to the direction of segment block adjustment movement so as to effectively brace said blocks with respect to the annular plate portion and without substantially interfering with the adjustment resiliency of the inner plate portions, and means for applying adjustment pressure to the segment blocks.

2. A hub structure for a spoked wheel comprising a one piece member having in combination, an outer annular plate portion formed with alternate inner and outer offsets to which the wheel spokes are attached, inner plate portions extending inwardly from the outer portions and separated by a diametrical division, a pair of axle receiving segment blocks extending laterally from the inner plate portions, said inner plate portions transmitting annular torque pressure of the axle and segment blocks to the outer plate portion but having sufficient resiliency in a direction other than in the plane of torque action to permit opening and closing action of the segment blocks upon application of pressure thereto, bracing webs integrally connecting the segment blocks with the outer annular plate portion and disposed at substantially right angles to the direction of segment block adjustment movement so as to effectively brace said blocks with respect to the annular plate portion and without substantially interfering with the adjustment resiliency of the inner plate portions, and means for applying adjustment pressure to the segment blocks.

3. A traction wheel mounting for tractors comprising an axle having a keyway adjacent its outer end, a wheel having a hub to receive said axle end, said hub having opposed axle engaging segments that are connected through other portions of the hub so as to be substantially rigid therewith but having, through the resiliency in the material of such other portions, freedom for slight relative flexing movement radially, means for clamping the segments upon the axle, said hub having a key disposed for radial movement in the axle keyway when the segments are clamped upon the axle, said key and keyway being tapered in cross section and the key having a cross sectional area greater than the adjacent cross section of the keyway so that the sides of the key and keyway will have wedging contact before the inner face of the key can contact with the bottom of the keyway.

4. A wheel mounting for a tractor comprising a power driven axle, a projecting end of which is provided with a longitudinally disposed, radially tapered keyway, a hub for the tractor wheel having a pair of opposed segments for radially adjustable, clamping engagement over the axle end, one of said segments having a key for engagement in the keyway, said key being radially tapered to correspond with the taper of the keyway but slightly wider than the keyway so that it will contact the side walls thereof before other adjacent portions of such segment engage adjacent axle surfaces when the segments are clamped upon the axle, and said segments having arcuate axle engaging surfaces the curvatures of which are defined by radii shorter than the radius of the shaft whereby the ends of the segments, when clamped upon the axle, will initially contact with and grip the axle before the intermediate portions of the segments can contact with the axle.

JOHN R. ORELIND.